United States Patent Office 3,194,821
Patented July 13, 1965

3,194,821
17α-SUBSTITUTED 17β-HYDROXYESTRENES
Leslie A. Freiberg, Waukegan, and John Wayne Cole, Deerfield, Ill., assignors to Abbott Laboratories, North Chicago, Ill., a corporation of Illinois
No Drawing. Filed Dec. 30, 1963, Ser. No. 334,652
9 Claims. (Cl. 260—397.1)

The present invention is directed to new steroids and their manufacture. More particularly, the invention concerns compounds of the estrane series with one or more double bonds in the A-ring and being substituted at the 3,17α and 17β positions.

These compounds are characterized by the formula

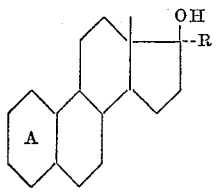

wherein R is selected from the group consisting of

—CH$_2$COO—loweralkyl, —CH$_2$CH$_2$OH and —CH$_2$CH$_2$OCOCH$_3$, and wherein the A-ring has a configuration selected from the group consisting of

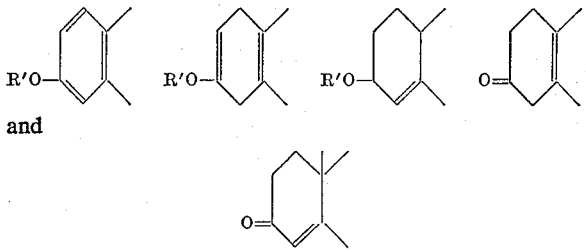

wherein R' is selected from the group consisting of hydrogen, loweralkyl and aryl-loweralkyl.

The new compounds have a combination of growth-promoting and estrogenic activity; they may be used in the way known estrogens are used for promoting growth in warm-blooded animals. They are stable compounds with a useful solubility in aqueous solvent systems.

In a simple outline, the new compounds are made according to the following scheme: an estrone alkyl ether is treated with zinc and a bromoacetic acid ester to form the corresponding ester of 17β-hydroxy-3-alkoxy-1,3,5(10)-estratriene-17α-ylacetic acid from which the corresponding 17α-(2-hydroxyethyl) analog is obtained by treatment with lithium aluminum hydride. The obtained 3 - alkoxy - 17β-hydroxy-17α-(2-hydroxyethyl)-1,3,5(10)-estratrient can be modified in the A-ring to compounds with one or two double bonds, and the 3-alkoxy group can be replaced by a hydroxy group and if desired, converted to a carbonyl group by known methods.

To better understand the processes leading to the new compounds of the present invention, reference is made to the following examples which are meant to be illustrations only and are in no way designed to limit the invention.

*Example 1.—Ethyl 17β-hydroxy-3-methoxy-1,3,5(10)-estratriene-17α-ylacetate*

A mixture of 430 ml. of diethyl ether, 214 ml. of benzene, 12.0 grams of acid-washed electrolytic zinc sponge, and 0.07 gram of iodine is stirred at reflux until the color of iodine is discharged. To this mixture is added 5.2 ml. of ethyl α-bromoacetate followed by 10.0 grams of estrone methyl ether in 150 ml. of benzene. The mixture is refluxed for 5 hours during which time five 12-gram portions of zinc are added at 45-minutes intervals, and two 7-ml. portions of ethyl α-bromoacetate are added at 90-minute intervals. The mixture is then cooled in an ice bath and 70 ml. of 1:5 acetic acid/methanol is added slowly. The mixture is filtered and washed successively with 3 N hydrochloric acid, 5% aqueous sodium hydroxide, and water. After drying the solution over magnesium sulfate, the solvent is evaporated in vacuo. The residue is crystallized from aqueous methanol to give ethyl 17β - hydroxy-3-methoxy-1,3,5(10)-estratriene-17α-ylacetate melting at 101–103° C.

*Example 2.—Ethyl 17β-hydroxy-3-benzyloxy-1,3,5(10)-estratriene-17α-ylacetate*

Following the procedure of Example 1, 1.94 grams of estrone benzyl ether is converted to 2.36 grams of a residue which is chromatographed on 60 grams of Florisil (a synthetic magnesium silicate from the Floridin Company, Tallahassee, Fla.). The benzene eluates are combined and are crystallized from methanol/water to give ethyl 17β-hydroxy-3-benzyloxy-1,3,5(10)-estratriene-17α-ylacetate melting at 75–78° C.

*Example 3.—3-methoxy-17β-hydroxy-17α-(2-hydroxyethyl)-1,3,5(10)-estratriene*

A mixture of 1.0 liter of dry tetrahydrofurane and 1.65 grams of lithium aluminum hydride is refluxed. After 15 minutes, 6.71 grams of ethyl 17β-hydroxy-3-methoxy-1,3,5(10)-estratriene-17α-ylacetate in 60 ml. of benzene is added within a period of 15 minutes. The mixture is boiled for 2 hours and then the excess lithium aluminum hydride is decomposed by adding ethyl acetate. To this mixture is added 75 ml. of water and 15 ml. of concentrated hydrochloric acid and the tetrahydrofurane is evaporated in vacuo. The crystalline residue is removed by filtration and is recrystallized from aqueous methanol to give 3-methoxy-17β-hydroxy-17α-(2 - hydroxyethyl)-1,3, 5(10)-estratriene. This substance is dimorphic, melting at 140–143° C. and 156–159° C.

*Example 4.—3-benzyloxy-17β-hydroxy-17α-(2-hydroxyethyl)-1,3,5(10)-estratriene*

Following the procedure of Example 3, ethyl 3-benzyloxy - 17β - hydroxy-1,3,5(10)-estratriene-17α-ylacetate is converted to 3-benzyloxy-17β-hydroxy-17α-(2-hydroxyethyl)-1,3,5(10)-estratriene melting at 164–165° C. after recrystallization from benzene/hexane.

*Example 5.—3-methoxy-17β-hydroxy-17α-(2-acetoxyethyl)-1,3,5(10)-estratriene*

To 0.12 gram of 3-methoxy-17β-hydroxy-17α-(2-hydroxyethyl)-1,3,5(10)-estratriene in 3 ml. of pyridine is added 2 ml. of acetic anhydride. The mixture is allowed to stand at 25° C. for 24 hours. Excess acetic anhydride is decomposed with ice and the mixture is diluted with water, and extracted with ether. The combined ether extracts are washed in sequence with 6 N hydrochloric acid, 4 N sodium hydroxide solution, and water. After drying the solution over magnesium sulfate, the solvent is evaporated in vacuo. The residue is crystallized from hexane to give 3-methoxy-17β-hydroxy-17α-(2-acetoxyethyl)-1,3,5(10)-estratriene, melting at 114–116° C.

*Example 6.—3-methoxy-17β-hydroxy-17α-(2-hydroxyethyl)-2,5(10)-estradiene*

Using a Dry-Ice condenser, 80 ml. of liquid ammonia is distilled into a 500-ml. three-neck boiling flask under a positive pressure of dry nitrogen. A solution of 0.509 gram of 3-methoxy-17β-hydroxy-17α-(2-hydroxyethyl)-1,3,5(10)-estratriene in 120 ml. of ethyl ether is added to the ammonia and the mixture is stirred vigorously while 0.7 gram of lithium is added in pieces over a period of 2 minutes. The mixture is stirred for 10 minutes and 10 ml. of ethanol is added dropwise within the next 15 minutes. The ammonia is then allowed to evaporate and the mixture is warmed to 25° C. After adding 100 ml. of water, the ether layer is separated, washed with water, and dried over magnesium sulfate. After evaporating the ether in vacuo, 3-methoxy-17β-hydroxy-17α-(2-hydroxyethyl)-2,5(10)-estradiene, melting at 125–135° C. is obtained.

*Example 7.—17β-hydroxy-17α-(2-hydroxyethyl)-4-estren-3-one and 17β-hydroxy-17α-(2-hydroxyethyl)-5(10)-estren-3-one*

(a) A solution of 0.521 gram of 3-methoxy-17β-hydroxy-17α-(2-hydroxyethyl)-2,5(10)-estradiene in a mixture of 35 ml. of methanol and 15 ml. of 3 N hydrochloric acid is refluxed for 30 minutes. The mixture is cooled and diluted with water and extracted with ether. The combined ether extracts are washed in sequence with aqueous sodium bicarbonate and water, dried over magnesium sulfate, and are evaporated in vacuo. The residue is crystallized from ethyl acetate giving 17β-hydroxy-17α-(2-hydroxyethyl)-4-estren-3-one, melting at 202–205° C., $$\lambda_{max.}^{MeOH}\ 240\ m\mu$$

ε 15,800.

(b) When the product of Example 6 is dissolved in methanol and treated at room temperature for 20 minutes with oxalic acid, the enol-ether is hydrolyzed, giving as the product 17β-hydroxy - 17α - (2-hydroxyethyl)-5(10)-estren-3-one. It is isolated like its isomer in (a) above. By treating the new 5(10)-estrene with 3 N hydrochloric aicd as in (a) above, 17β-hydroxy-17α-(2-hydroxyethyl)-4-estren-3-one is obtained.

*Example 8.—3,17β-dihydroxy-17α-(2-hydroxyethyl)-1,3,5(10)-estratriene*

To a solution of 0.4 gram of 3-benzyloxy-17β-hydroxy-17α-(2-hydroxyethyl)-1,3,5(10)-estratriene in methanol is added 0.1 gram of 5% palladium on charcoal. The mixture is reduced with hydrogen gas at atmospheric pressure and at room temperature until hydrogen uptake ceases. The mixture is then filtered and the filtrate evaporated in vacuo to produce a residue of 3,17β-dihydroxy-17α-(2-hydroxyethyl)-1,3,5(10)-estratriene which, after crystallizing from aqueous methanol, melts at 239–240° C.

*Example 9.—3ξ,17β-dihydroxy-17α-(2-hydroxyethyl)-4-estrene*

A solution of 17β-hydroxy-17α-(2-hydroxyethyl)-4-estren-3-one in methanol is stirred and treated with about an equal weight of sodium borohydride for two hours. The reaction mixture is neutralized by dropwise addition of acetic acid, after which water is added to precipitate the crude product. The triol, 3ξ,17β-dihydroxy-17α-(2-hydroxyethyl)-4-estrene is purified by chromatography on Florisil as in Example 2.

The initial reaction carried out on the estrone alkyl ether is generally known as a Reformatzky reaction. It requires the use of a loweralkyl ester of bromoacetic acid and activated, finely-divided zinc and is carried out in an inert solvent. The term "inert solvent" is used to express that the solvent used is not participating in the reaction and will not interfere with any of the reactants present or the products formed. The term "activated zinc" is used to express that the finely divided metallic zinc is made reactive by an initiator commonly used in a Reformatzky reaction, e.g., elemental iodine, bromine, mercury, etc. As reaction media, ethers such as diethyl ether or tetrahydrofurane, aromatic liquids such as benzene, toluene or xylenes, or an aliphatic or cycloaliphatic hydrocarbon such as pentane, cyclohexane, heptane, etc. or compatible mixtures of the above may be used.

It will be obvious to those skilled in the art that the process shown in Examples 1 and 2 can be carried out equally well with other loweralkyl esters of bromoacetic acid to produce analogous esters of 3-substituted 17β-hydroxy-1,3,5(10)-estratriene-17α-ylacetic acid. In this manner, propyl, isobutyl and other alkyl esters can be made. The free acid can be obtained from these loweralkyl esters by known saponification methods using potassium hydroxide in aqueous methanol solution under reflux conditions. It will also be obvious to those skilled in the art that the compounds shown in Examples 6 and 8 can easily be acetylated to give the corresponding 17α-(2-acetoxyethyl) compounds.

Others may practice the invention in any of the numerous ways which will be obvious to one skilled in the art by the present disclosure. All such practice of the invention is considered a part hereof provided it falls within the scope of the appended claims.

We claim:

1. A compound of the formula

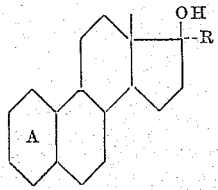

wherein R is selected from the group consisting of —CH₂COO-loweralkyl, —CH₂CH₂OH, and $$-CH_2CH_2OCOCH_3$$

and wherein the A-ring has a configuration selected from the group consisting of

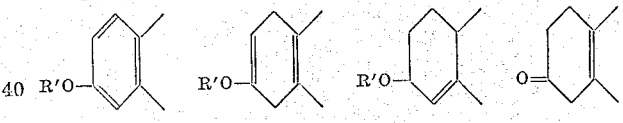

and

wherein R' is selected from the group consisting of hydrogen, loweralkyl and phenylloweralkyl.

2. Ethyl 17β-hydroxy-3-methoxy - 1,3,5(10) - estratriene-17α-ylacetate.

3. Ethyl 17β-hydroxy-3-benzyloxy-1,3,5(10) - estratriene-17α-ylacetate.

4. 3-methoxy - 17β - hydroxy-17α-(2-hydroxyethyl)-1,3,5(10)-estratriene.

5. 3-benzyloxy - 17β - hydroxy-17α-(2-hydroxyethyl)-1,3,5(10)-estratriene.

6. 3-methoxy-17β-hydroxy-17α-(2-acetoxyethyl) - 1,3,5(10)-estratriene.

7. 3-methoxy - 17β - hydroxy-17α-(2-hydroxyethyl)-2,5(10)-estradiene.

8. 17β-hydroxy-17α(2-hydroxyethyl)-4-estren-3-one.

9. 3,17β-dihydroxy-17α-(2-hydroxyethyl) - 1,3,5(10)-estratriene.

References Cited by the Examiner

UNITED STATES PATENTS 2,918,463  12/59  Cella _____ 260—397.1
3,051,730  8/62   Bowers et al. _____ 260—397.1

LEWIS GOTTS, *Primary Examiner.*